(12) United States Patent
Lee

(10) Patent No.: US 7,364,229 B2
(45) Date of Patent: Apr. 29, 2008

(54) AUTOMATIC VENTILATION DEVICE FOR CHAIR

(76) Inventor: Hwang-Pao Lee, No.807, Po-Ai Street, Chu Pei City, Hsin Chu Hsien (TW)

( * ) Notice: Subject to any disclaimer, the term of this patent is extended or adjusted under 35 U.S.C. 154(b) by 366 days.

(21) Appl. No.: 11/169,724

(22) Filed: Jun. 30, 2005

(65) Prior Publication Data

US 2007/0001490 A1    Jan. 4, 2007

(51) Int. Cl.
*A47C 7/72*    (2006.01)
(52) U.S. Cl. .................. 297/180.16; 297/452.42; 297/DIG. 8
(58) Field of Classification Search ......... 297/180.16, 297/452.42, 452.43, 452.44, 452.45, 452.46, 297/452.47, DIG. 3, DIG. 8
See application file for complete search history.

(56) References Cited

U.S. PATENT DOCUMENTS

| | | | | |
|---|---|---|---|---|
| 580,284 A | * | 4/1897 | Krieg | 297/180.16 |
| 757,447 A | * | 4/1904 | Friedland | 297/180.16 |
| 847,238 A | * | 3/1907 | Carroll | 454/105 |
| 1,118,353 A | * | 11/1914 | Jurkowski | 297/180.16 |
| 3,144,270 A | * | 8/1964 | Bilancia | 297/180.16 |
| 5,082,326 A | * | 1/1992 | Sekido et al. | 297/284.6 |
| 5,253,377 A | * | 10/1993 | Larson | 5/679 |

* cited by examiner

*Primary Examiner*—Sarah B. McPartlin

(57) ABSTRACT

An automatic ventilation device for chairs uses a movable plate that moves upwards and downwards along with a cushion. A reset spring is disposed on the movable plate. The upper side and lower side of movable plate each have a stretchable air bag. When the removable plate moves upwards and downwards, one air bag is extended while the other is compressed. The upper and lower air bags have one-way air inlets and outlets respectively while the air outlets are connected to the chair cushion and the chair back for blowing air to the chair cushion and chair back.

6 Claims, 7 Drawing Sheets

AUTOMATIC VENTILATION DEVICE FOR CHAIR

BACKGROUND OF THE INVENTION

The present invention relates to an automatic ventilation device for chairs, especially to a ventilation device that takes advantages of movement of a chair's cushion.

For pursuing greatest comfort of chairs in automobiles or offices, the chairs are designed according to ergonomics principles. In designing chairs, the permeability and ventilation are also considered. Sweat or heat from the skin may cause users discomfort. Although there is a cushion with air-blowing function, it needs external power sources such as automotive batteries to drive a fan or a pump for blowing an air to achieve good ventilation.

SUMMARY OF THE INVENTION

Therefore it is a primary object of the invention to provide an automatic ventilation device for chairs that uses a removable plate disposed in a cushion and moves upwards and downwards along with the cushion. Reset springs are arranged on the removable plate and an upper air bag as well as a lower air bag are also disposed on the removable plate. While the removable plate moves upwards and downwards, one of the air bags extends while the other air bag compresses. Moreover, one-way air inlets as well as air outlets are arranged on the upper and lower air bags and the air outlets connect to surfaces of chair seat and chair back in contact with a user. While driving over rough road or changing the sitting posture, the removable plate moves upwards and downwards along with the movement of the cushion so as to make one of the air bags compress to exhaust air therein while the other air bag extends to input air.

Thus the air is blowing into or out of the chair seat or the chair back. For saving energy without power unit, the device has a cooling effect and makes users comfortable.

DETAILED DESCRIPTION OF THE PREFERRED EMBODIMENT

Figure 1:
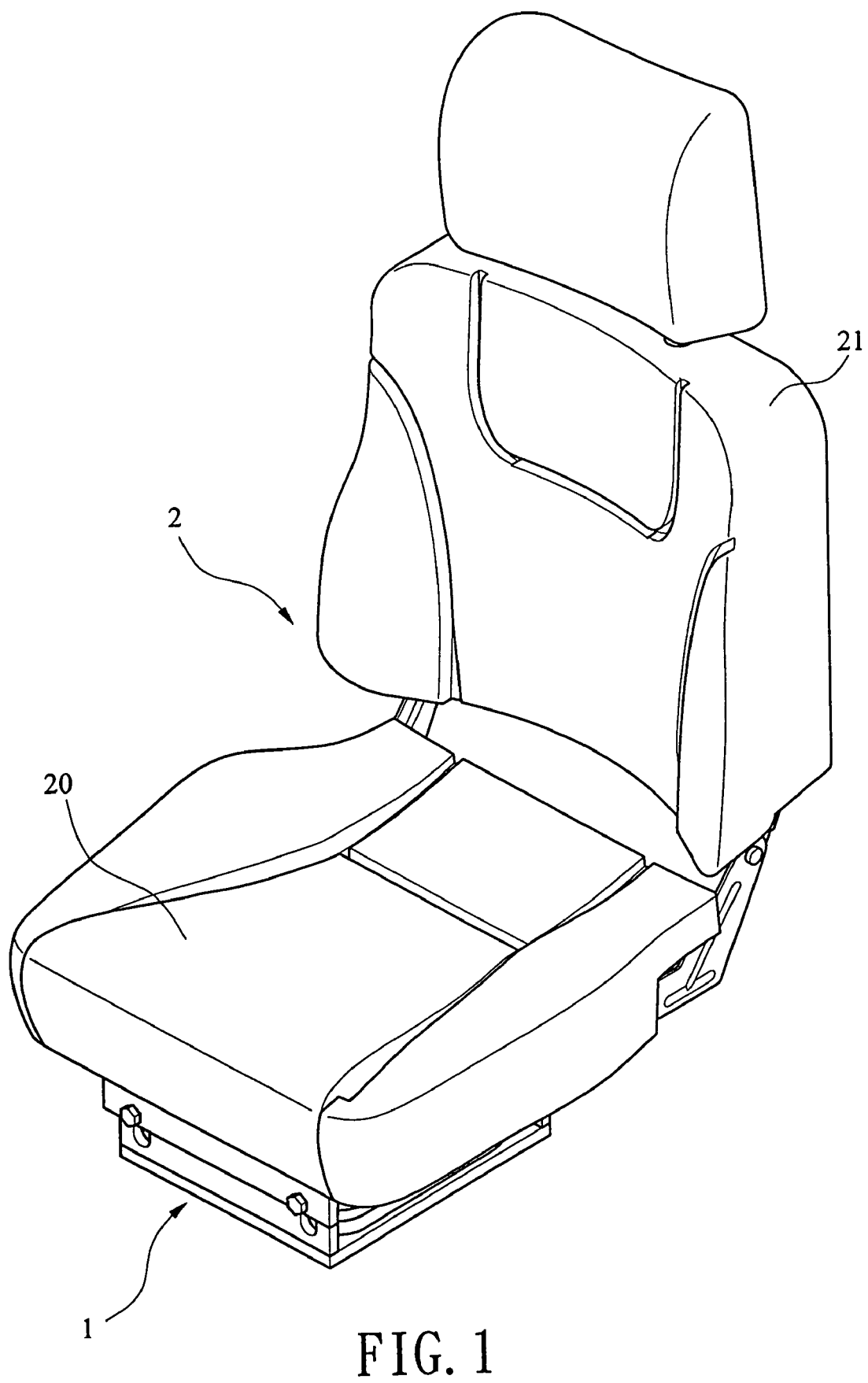
FIG. 1 is a perspective view of a chair according to one embodiment of the present invention assembled with a chair seat.
Figure 2:
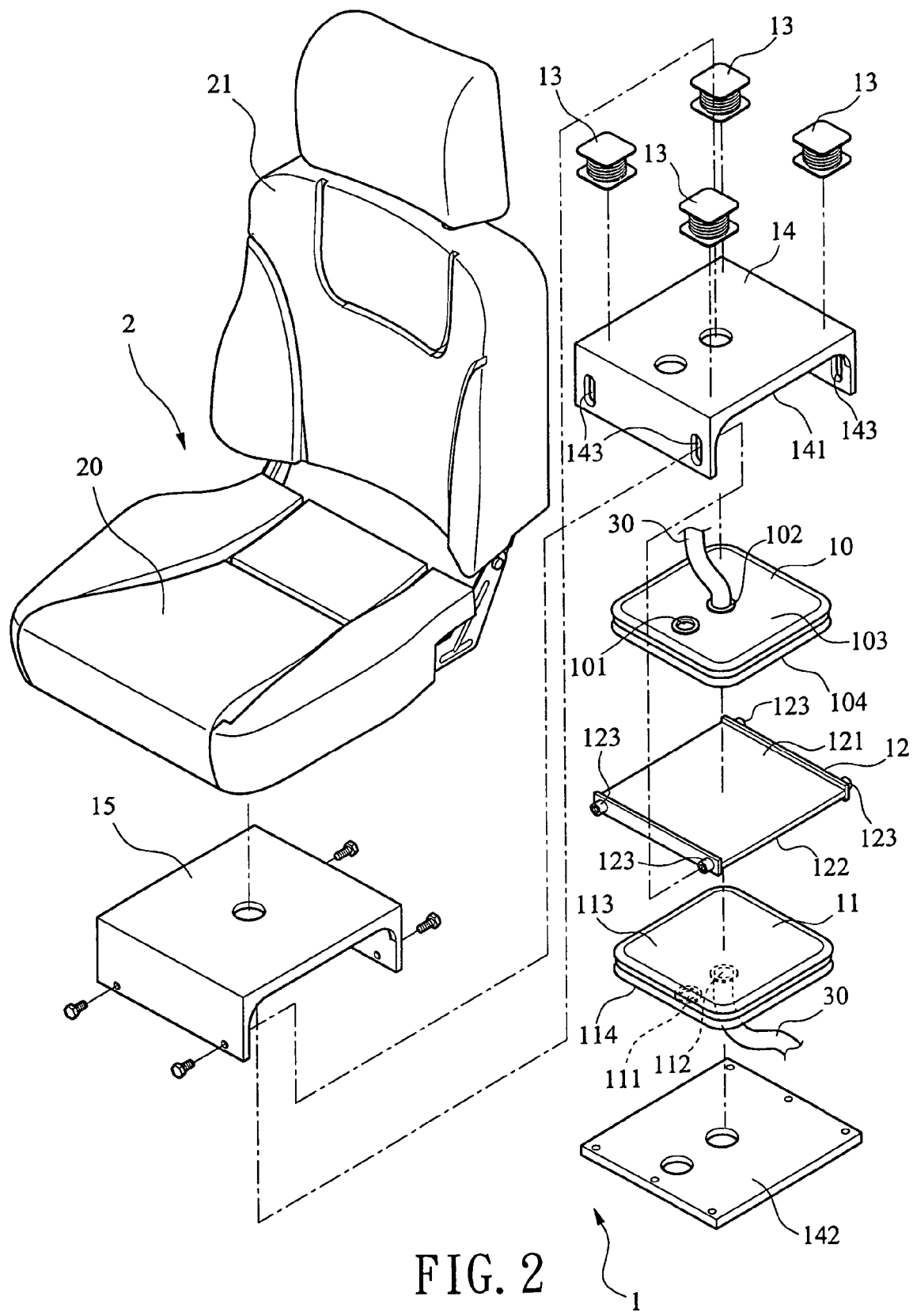
FIG. 2 is an exploded view of the chair seat shown in FIG. 1.

Referring to FIG. 1 to FIG. 4, an automatic ventilation device for chairs 1 of the present invention are shown with a cushion 20 of a chair 2. The present invention includes an upper stretchable air bag 10, a lower stretchable air bag 11 and a movable plate 12. The plate 12 moves upwards and downward and is disposed between the two air bags 10, 11, and a plurality of reset spring 13 that returns the movable plate 12 to its original position. The movable plate 12 is connected with and arranged under the cushion 20 of the chair 2 to form a couple, moving together. There is no limitation in the way of connection while the movable plate 12 and the cushion 20 move upwards and downwards synchronously under a certain range of height. The upper and lower stretchable air bags 10, 11 are extended or compressed vertically and are disposed on upper side and lower side of the movable plate 12. When the movable plate 12 moves upwards and downwards, one of the upper and the lower air bags 10, 11 is extended for intake of air while the other is compressed for exhausting gas-acting in an opposite way. Moreover, each of the stretchable air bags 10, 11 has their respective one-way air intakes 101, 111 and one-way air outlets 102, 112 for the intake and exhausting of air. When the upper and the lower air bags 10, 11 are extended, air enter into the air bags 10, 11 through the air intakes 101, 111 respectively. When the upper and the lower air bags 10, 11 are compressed, air are expelled form the air bags 10, 11 through the air outlets 102, 112. Furthermore, the air outlets 102, 112 of the air bags 10, 11 are connected to an outer surface of the cushion 20 or a seat back 21 of the chair 1 by a connecting duct 30. Thus the air exhausted from the air bags 10, 11 is blowing out of the cushion or the seat back 20, 21 through the ventilation structure thereof to cool a user. There are various design for the ventilation structure on the cushion 20 or the seat back 21 such as vent holes 202 on sponge 201 therein or a breathable fabric on the surface of the sponge. Thus the sponge of the cushion 20 or the seat back 21 is breathable and comfortable.

Moreover, a box-shaped lower frame 14 is used as a base. The upper and lower air bags 10, 11 with the movable plate 12 on the middle thereof are arranged inside inner space of the lower frame 14 while the top surface 103 and bottom surface 104 of the upper air bag 10 are connected with an inner top surface 141 of the lower frame 14 and an upper plate 121 of the removable plate 12 respectively. Moreover, the movable plate 12 is capable of moving upwards and downwards inside the inner space between the removable plate 12 and the lower frame 14 by vertical rails 120. The rails 120 consist of a plurality of guiding block 123 disposed on the movable plate 12 and a plurality of corresponding guiding slots 143 in vertical direction on the lower frame 14. The guiding blocks 123 moves vertically inside the guiding slots 143. Furthermore, a C-shaped upper frame 15 for shielding is covered on top of the lower frame 14, uses the guiding blocks 123 as load bearing points so as to make the upper frame 15 moves vertically along with the movable plate 12, corresponding to the lower frame 14. The upper frame 15 is arranged on the bottom of the cushion 20 of the chair 2 so that the upper frame 15 and the cushion 20 move together. Reset springs 13 having a plurality of compression spring are set between the upper frame 15 and the lower frame 14. Once the combination of the cushion 20, the upper frame 15 and the removable plate 12 moves downwards to compress the springs 13, they will return to the original position by restoring force of the springs 13.

Figure 5:
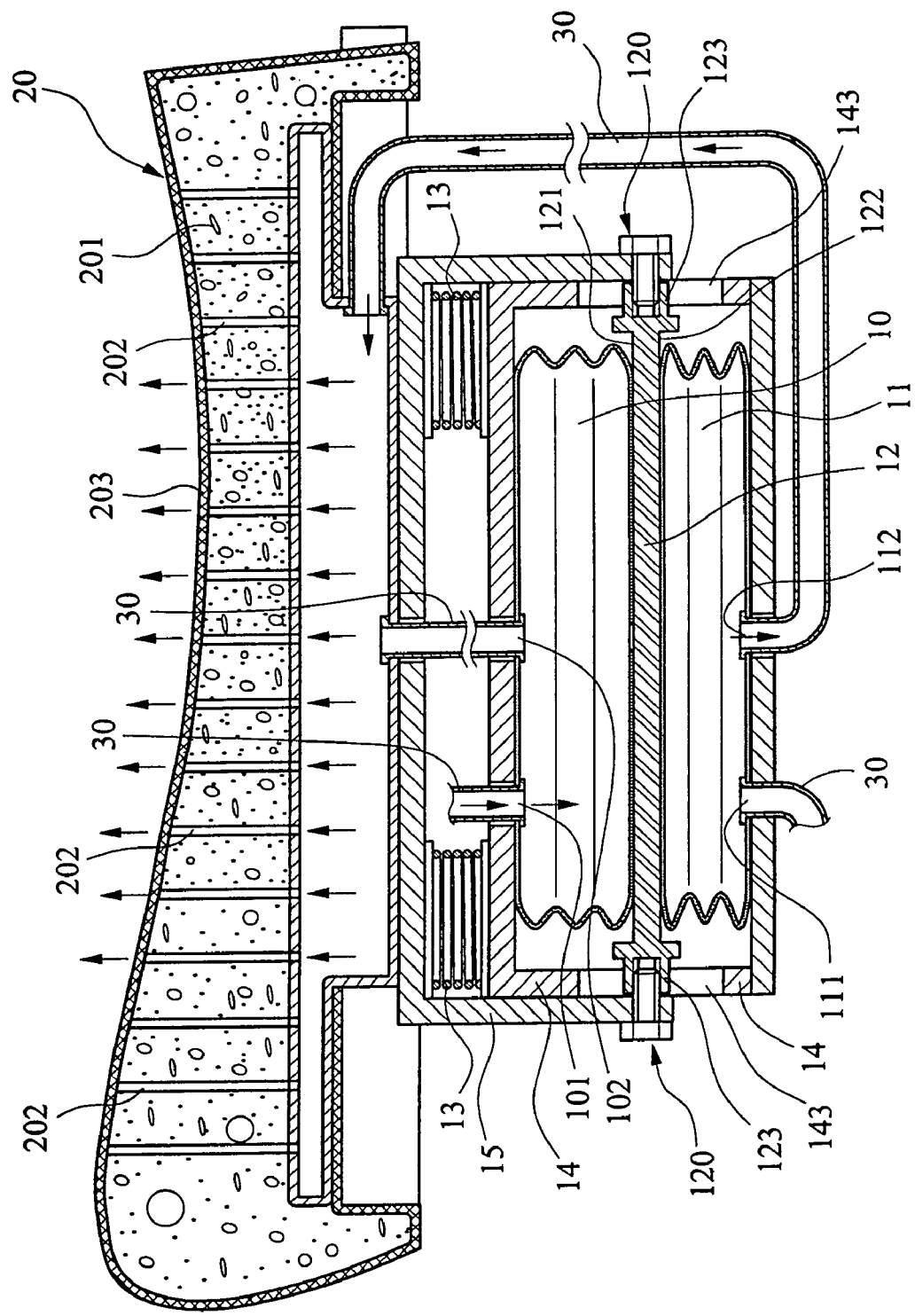
FIG. 5 is a schematic drawing showing air flow in a chair in accordance with the present invention when the cushion is moving downwards.

When users sit on the cushion 20 of the seat 2 and moves upwards or downwards along with the movement of the cushion 20 while driving over rough roads or changing the sitting posture. Refer to FIG. 5, the combination of the cushion 20, the upper frame 15 and the movable plate 12 moves downwards, the upper air bag 10 extends while the lower air bad 11 compresses to exhaust air inside through the air outlet 112 that connects to the surfaces of the cushion 20 of the chair seat 2 or the chair back 21 by the connecting duct 30.

Figure 6:
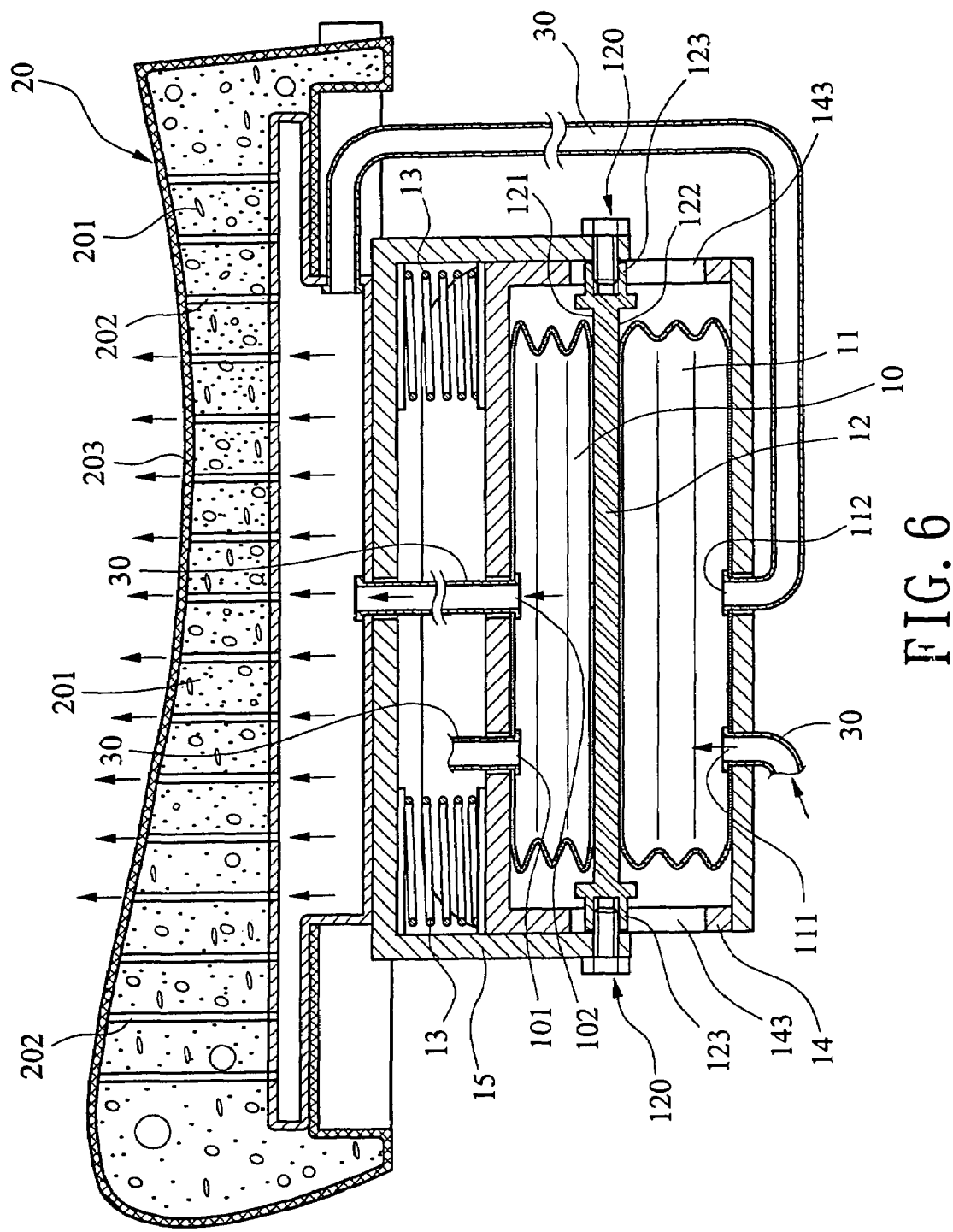
FIG. 6 is a schematic drawing showing air flow in a chair in accordance with the present invention when the cushion is moving upwards.

While when the combination of the cushion 20, the upper frame 15 and the movable plate 12 moves upwards by the action of the reset springs 13, as shown in FIG. 6, the lower air bag 11 extends for inputting air while the upper air bag 10 compresses to exhaust air therein through the air outlet 102 that connects to the surface of the cushion 20 of the chair seat 2 or the chair back 21 by the connecting duct 30. Therefore, there is blowing air when the cushion 20 moves upwards or downwards. Thus, the device has a cooling effect and makes users comfortable without a power unit.

Figure 3:
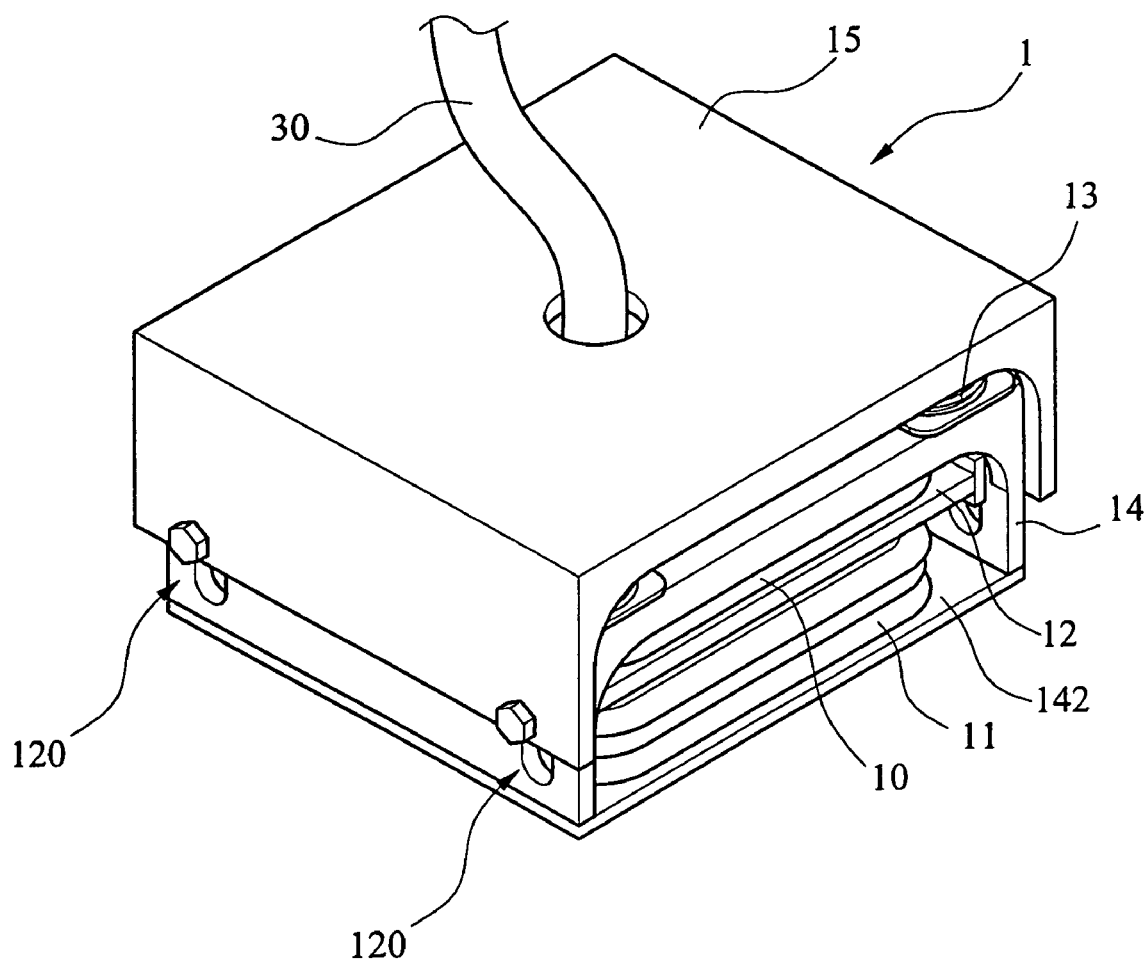
FIG. 3 is a perspective view of an embodiment in accordance with the present invention.
Figure 4:
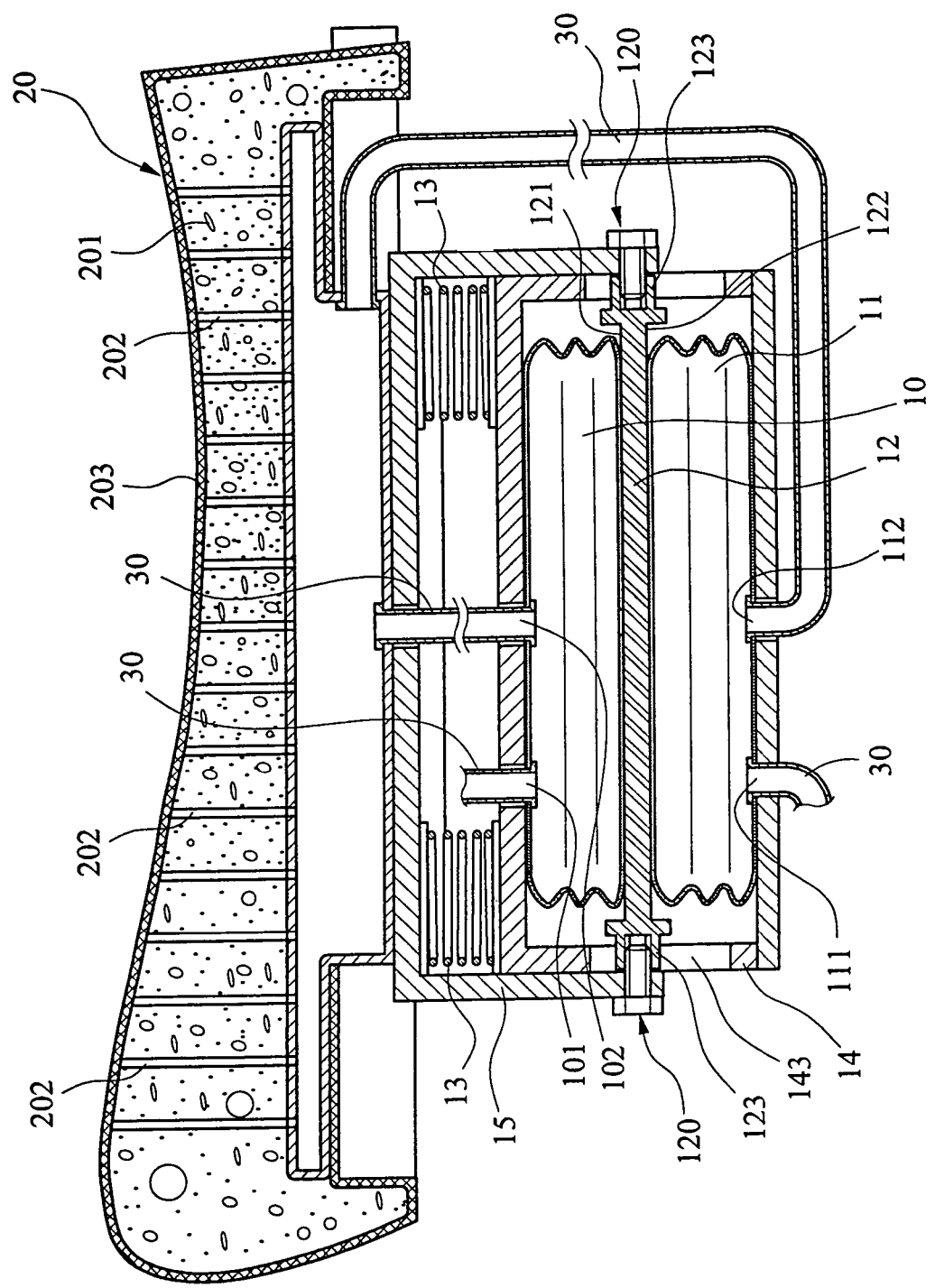
FIG. 4 is a cross-sectional view of the chair seat shown in FIG. 1.
Figure 7:
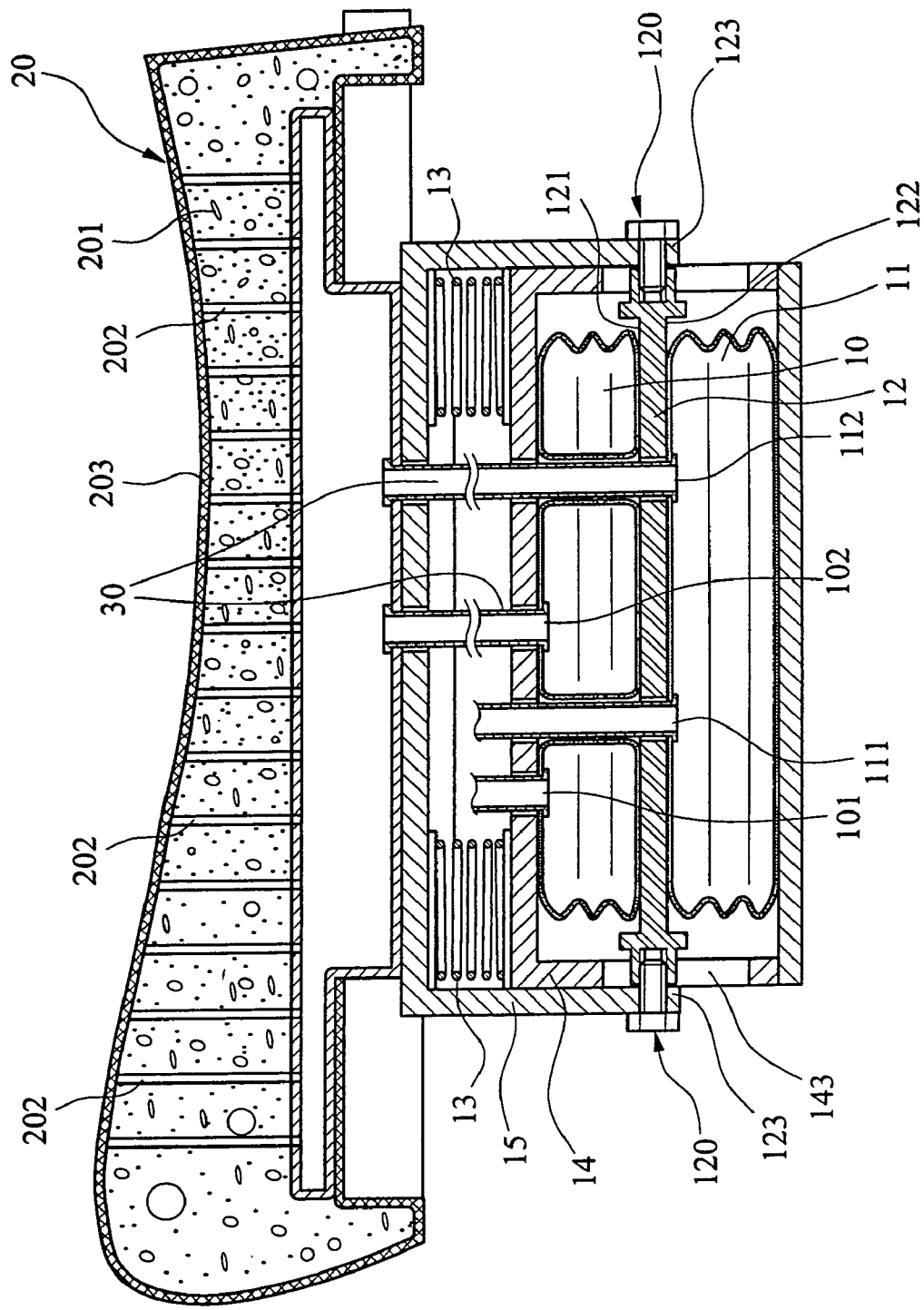
FIG. 7 is a cross-sectional view of another embodiment of the present invention.

There is no limits on disposition way or position of the connecting ducts 30, one-way air inlets 101, 111 and air outlets 102, 112 arranged on the upper air bag and lower air bag 10, 11. The air inlets 101, 111 and air outlets 102, 112 are connected to the chair seat 20 or the chair back 21 by the exposed connecting ducts 30, as shown in FIG. 3 & FIG. 4, or by the inner connecting ducts 30, as shown in FIG. 7 so that the air inlet 111, the air outlet 112, and the connecting ducts 30 pass through the top side 113, the removable plate 12, the upper air bag 10, the upper frame 15, and finally connect to the chair seat 20 or chair back 21 to avoid exposure of ducts and save space. In addition, the present invention can be applied to various kind of chairs such as automobile chairs, chairs of scooters, bicycle chairs or office chairs. The size of the automatic ventilation device for chairs 1 can be modified according to the size of the chairs. The automatic ventilation device for chairs 1 in accordance with the present invention can be modularized and downsized.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An automatic ventilation device arranged under a chair cushion comprising a lower frame, an upper frame, upper and a lower stretchable air bags, a moveable plate capable of moving upwards and downwards with respect to the lower frame, and reset springs, wherein the lower frame is box-shaped and the upper and lower air bags with the moveable plate in the middle thereof are arranged inside an inner space of the lower frame while a top surface and bottom surface of the upper air bag are connected with an inner top surface of the lower frame and an upper surface of the moveable plate respectively; the moveable plate is capable of moving upwards and downwards inside the inner space of the lower frame by vertical guiding rails;

the upper frame is a shielding frame arranged above the lower frame and connected with the moveable plate inside the lower frame and the cushion of the chair so that the upper frame and moveable plate move upwards and downwards together, with respect to the lower frame;

the moveable plate arranged between the upper and the lower air bags and connected with the upper frame as well as the cushion to form a connecting body that moves upwards and downwards synchronously within a certain range of height;

the upper and lower stretchable air bags having respective one-way air intakes and air outlets are disposed on an upper side and a lower side of the moveable plate respectively; when the moveable plate moves upwards and downwards, one of the upper and the lower air bags is extended for intake of air while the other is compressed for exhausting air; the one-way air outlets of the upper and the lower air bags are connected to the chair cushion or a seat back by a connecting duct so as to exhaust air through a ventilation structure on the cushion or the seat back;

the reset springs are set between the upper frame and the lower frame for providing a restoring force to make the connecting body return to an original position with respect to the lower frame;

when the cushion moves upwards and downwards, the moveable plate moves upwards and downwards synchronously so as to compress one of the lower and upper air bags to exhaust air while the other air bag extends to intake air for blowing to the cushion or the seat back.

2. The device as claimed in claim 1, wherein the ventilation structure on the cushion or the seat back has vent holes vertically arranged on a sponge of the cushion or the seat back or breathable fabric on a surface of the sponge.

3. The device as claimed in claim 1, wherein the guiding rails arranged between the moveable plate and the lower frame include a plurality of guiding blocks disposed on the moveable plate and a plurality of corresponding guiding slots mounted vertically on the lower frame so that the guiding blocks moves vertically inside the guiding slots and the upper frame is connected to the guiding blocks and uses the guiding blocks as load bearing points so as to make the upper frame move vertically along with the moveable plate.

4. The device as claimed in claim 1, wherein the air outlets and the connecting ducts on the upper and lower air bags are connected with an internal part of the cushion or the seat back so that air is exhausted through the cushion or seat back.

5. The device as claimed in claim 1, wherein the air outlets and the connecting ducts on the upper and lower air bags are connected with an internal part of the cushion or the seat back and are hidden inside the cushion or the seat back.

6. The device as claimed in claim 5, wherein the air outlet of the lower air bag as well as the connecting ducts pass through the moveable plate, the upper air bag, the upper frame, and connect to an inner side of the chair seat or the chair back while the air outlet of the upper air bag as well as the connecting ducts pass through the upper frame and then connect to the inner side of the chair seat or the chair back.

* * * * *